United States Patent [19]

Laing

[11] 3,825,059

[45] July 23, 1974

[54] METHOD FOR CHARGING A HEAT STORAGE VESSEL

[76] Inventor: Nikolaus Laing, 7141 Aldingen B., Stuttgart, Germany

[22] Filed: June 16, 1972

[21] Appl. No.: 263,661

Related U.S. Application Data

[62] Division of Ser. No. 54,553, July 13, 1970, Pat. No. 3,689,738.

[52] U.S. Cl. .................. 165/1, 126/400, 165/104, 219/341, 219/378, 219/530
[51] Int. Cl. ....... H05b 3/00, F24d 11/00, F24h 7/00
[58] Field of Search .......... 219/341, 365, 378, 530, 219/540, 325, 326, 399, 462; 165/18, 104, 1; 126/273.5, 400

[56] References Cited
UNITED STATES PATENTS

| | | | |
|---|---|---|---|
| 1,054,409 | 2/1913 | Harrison et al. | 219/365 |
| 2,022,812 | 12/1935 | Roe | 219/365 |
| 2,178,049 | 10/1939 | Mouton et al. | 219/325 UX |
| 3,558,856 | 1/1971 | Lawrence et al. | 219/378 X |

FOREIGN PATENTS OR APPLICATIONS

| | | | |
|---|---|---|---|
| 1,249,776 | 11/1960 | France | 219/341 |
| 660,030 | 8/1965 | Belgium | 219/378 |

*Primary Examiner*—A. Bartis
*Attorney, Agent, or Firm*—Pennie & Edmonds

[57] ABSTRACT

A method of charging a heat storage vessel containing a meltable normally solid heat storage mass having a greater density in its solid state than in its liquid state includes (1) applying heat to the bottom end wall of the vessel to melt the mass and (2) concurrently applying heat to a vertical side wall of the vessel to form a thin convection passage extending along a side of the solid storage mass from top to bottom thereof whereby there may be a flow of melted storage mass from the region adjacent the bottom end wall through said convection passage to an expansion space in said vessel above the storage mass.

1 Claim, 4 Drawing Figures

METHOD FOR CHARGING A HEAT STORAGE VESSEL

REFERENCE TO COPENDING APPLICATION

This application is a division of my U.S. Pat. application Ser. No. 54,553, filed July 13, 1970 now U.S. Pat. No. 3,689,738, dated Sept. 5, 1972.

OBJECTS OF THE INVENTION

The melting of solid materials enclosed in storage vessels, e.g. by means of electrical resistance heaters, for the purpose of storing latent heat frequently presents considerable difficulties, since the thermal conductivity of most of the crystalline materials suitable for heat storage is, by comparison with e.g. metals, extremely low even when in the solid state and as a rule even considerably worse in the molten state. Consequently elaborate measures for the admission of heat by means of metallic ribs or other means have to be taken in order to prevent local overheating resulting in vapor pressure or decomposition; their economics consequently become questionable.

Moreover, if the melt is lighter than its solid phase, excess pressures of an almost unlimited magnitude result locally, which cause the surrounding solid layers to burst; consequently the walls and heat exchange arrangements are frequently subjected to extremely high stresses and at the same time considerable noises are caused which preclude application to e.g. the heating of dwellings.

DESCRIPTION OF THE INVENTION

The invention avoids these disadvantages by means of a device in which the crystalline portion of the storage mass has a flat surface which is pressed against the heater. Thereby the continuously produced melt, which is no longer capable of absorbing any latent heat and possesses only low thermal conductivity, immediately flows away, so that direct thermal contact between the heater and the layer of the crystalline body is permanently maintained. Thereby high specific heat currents may be applied for melting the material, so that the heater itself becomes small and correspondingly cheap.

As a result of giving off its storage heat in the course of crystallization, the storage body contracts, so that a cavity is formed in the last region to solidify. When it is remelted, the storage mass expands again to the same degree. In order to avoid local areas of excess pressure, the invention provides, at least in the case of storage masses which contract during solidification, a connection between the region adjacent the heater and the said cavity by producing a connecting channel through which the excess melt flows away without the formation of excess pressures, by means of a second heater. For the purpose of storage in accordance with the invention it is necessary that the core of the store should become released from the walls of the vessel, so that it can describe the vertical movement necessary for the melting process. In accordance with the invention this is accomplished by means of a tapered construction of the vessel or also by heating the vertical wall of the vessel for short periods, with the aim of melting a thin zone adjacent the walls of the vessel and thereby to detach the core of the store from the wall of the vessel. Electric heaters as well as heaters with gaseous or liquid heat carriers are suitable for providing the heating effect.

If low melting point storage masses are used, the storage vessel can be made of heat sensitive materials, such as plastics materials. The walls of the vessel may also be so thin that they are deformable in a bellows-like manner, as soon as melting commences.

DESCRIPTION OF THE DRAWINGS

Referring to the drawings in which a preferred embodiment of my invention is illustrated.

DETAILED DESCRIPTION OF THE DISCLOSURE

The invention will now be explained with reference to the drawings.

Figure 1:
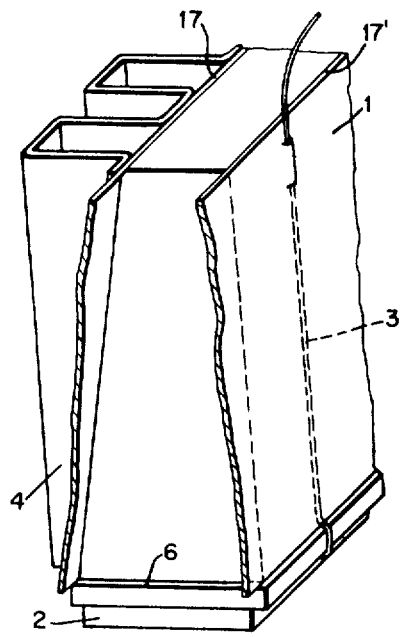
FIG. 1 shows a broken perspective view of a vessel constructed according to the invention.

FIG. 1 shows diagrammatically a storage body for a night storage heater, which comprises a tapered plastics vessel 1 having a top portion 18 where the vessel is closed at the bottom by a metallic base. Underneath the base a resistance heater 2 is provided which together with the base is connected to the vessel 1 by the bead 6. The supply conductor 3 to the heater also comprises a resistance wire extending over the height of the container and is connected with the vessel 1 in heat conducting manner. Corrugated aluminium ribs 4 are connected with the walls of adjacent vessels in heat conducting manner and dissipate heat to air which is conducted through them.

Figure 2:
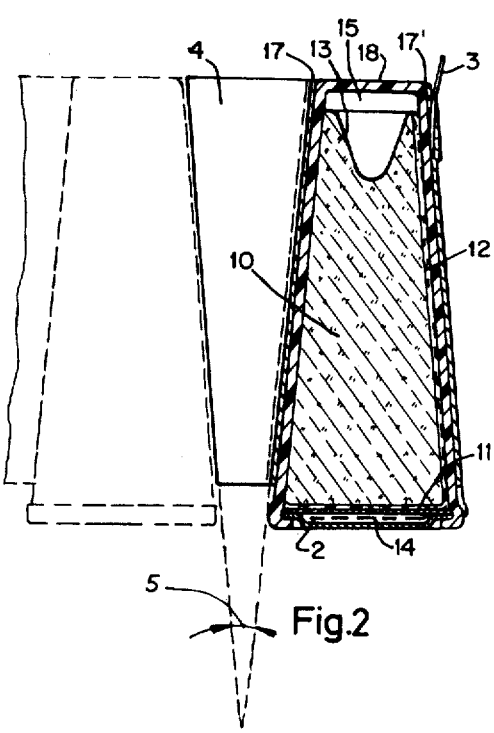
FIG. 2 is a section of the vessel of FIG. 1 showing the mass in the solidified form and also showing the relationship of the vessel with adjacent vessels.

FIG. 2 shows a vertical section through a vessel in accordance with FIG. 1 in its discharged condition. The interior is charged with a storage mass 10. Since the storage mass, in its solid condition, occupies an appreciably smaller volume than in its liquid condition, a trough 13 is formed in the upper region of the solid body which serves as an expansion space. As soon as the heater 2 is switched on, the storage mass above the base 11 begins to melt. Since however the supply conductor 3 also develops heat and since it possesses a smaller heat capacity than the heater 2, a strip 12 of melt is produced along a boundary line of the solid body of storage mass 10, so that the melt 14 above the base 11 communicates with the upper region 15 of the vessel 1. Thereby an excess pressure may be created. In view of the higher specific gravity of the storage mass 10, the melt 14 is compressed into a thin film, so that a very good heat conducting contact is formed between the heater 2 and the body of storage mass 10.

Figure 3:
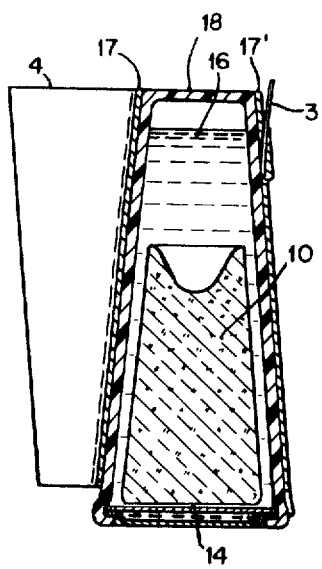
FIG. 3 is a view similar to FIG. 2 showing a portion of the mass in solidified form and in melted form.

FIG. 3 shows the vessel in its partially charged-up condition. The body of storage mass 10 has by now melted to a large extent and is surrounded on all sides by melt. Nevertheless, the layer 14 remains extremely thin until the body of storage mass 10 has melted in its entirety. The small amount of heat generated by the supply conductor 3 is transmitted to the molted storage mass 16 by convection.

At least those portions of the wall of the vessel not heated by the heaters may be made of a thin deformable plastics material such that the walls will move in a bellows-like manner when melting commences; this further assures that the solid portion of the storage mass may move vertically within the vessel.

Figure 4:
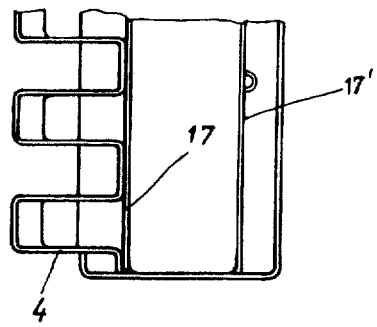
FIG. 4 is a plan view of a portion of FIG. 1.

FIG. 4 shows the construction of the ribs 4 which consist of a corrugated metal sheet and very thin metal plates 17 and 17' which serve the purpose of heat distribution. The angle 5 is of such a value that adjacent storage vessels can be contiguously juxtaposed in sequence.

I claim:

1. A method of charging an enclosed heat storage vessel containing a normally solid meltable heat storage mass having a greater density in its solid state than in its liquid state and where said vessel has a horizontally extending bottom end wall, a main heater on the outside of said bottom end wall and in thermal contact therewith, a vertically extending side wall, an auxiliary heater on the outside of said vertical extending side wall extending along the heighth thereof and in thermal contact therewith, and an expansion space above the storage mass in said vessel when all of said mass is in the solid state, comprising the step of applying heat to said bottom end wall by said main heater to cause the solid storage mass adjacent thereto to melt and maintain a thin film of liquid storage mass between the bottom end wall and the bottom of the solid storage mass and the additional step of concurrently applying heat to said side wall by said auxiliary heater to cause the storage mass adjacent thereto to melt in a thin film to form a thin convection passage extending along a side of the solid storage mass from the bottom to the top thereof whereby there may be a flow of melted storage mass from the region adjacent the bottom end wall through said convection passage into the expansion space.

* * * * *